Jan. 7, 1964   R. E. PANZER   3,117,032
NONAQUEOUS SOLVENT ELECTROLYTES
Filed May 29, 1961

RICHARD E. PANZER
INVENTOR.

BY *J. M. St. Amand*

ATTORNEY

United States Patent Office 3,117,032
Patented Jan. 7, 1964

3,117,032
NONAQUEOUS SOLVENT ELECTROLYTES
Richard E. Panzer, Arlington, Calif., assignor to the United States of America as represented by the Secretary of the Navy
Filed May 29, 1961, Ser. No. 113,558
(Granted under Title 35, U.S. Code (1952), sec. 266)
15 Claims. (Cl. 136—4)

The invention herein described may be manufactured and used by or for the Government of the United States of America for governmental purposes without the payment of any royalties thereon or therefor.

The present invention relates to improvements in battery cell electrolytes, and more particularly to non-aqueous electrolytes for current-producing, heat-activated, electrochemical cells.

The use of new types of electrochemical power supplies have been required, in recent years, to operate electronic systems for a wide variety of applications. Development of such power supplies has placed severe requirements on electrode materials, solvents and containers. Considerations as to small size, high power, and high (or very low) temperature environments of power supplies have led researchers in this field to investigate electrochemical systems and materials which would not have otherwise received consideration for use in power supplies.

Until recently the electrolytes of electrochemical power supplies have usually been water solutions of salts, acids or bases. However, the use of water automatically reduced battery performance in case of extremes of temperature. Although some reduction in freezing point and elevation of boiling point is possible, aqueous electrolytes are severely limited in the environments to which they may be subjected.

Investigations have been conducted to find electrolytes which have a wide liquidus range and alternately, to find an electrolyte that may be heated easily at low temperatures to achieve a wide temperature range of operation. Molten salts, liquid ammonia, nonaqueous organic and inorganic liquids of various types are examples of systems that may be used. All of these electrolytes must have one characteristic for successful operation in a current-producing battery cell: the electrolyte must be either ionic or an ionizing solvent. Then, through the use of additives or modification of the solvent it may be possible to develop a useful power supply electrolyte.

The present invention relates to the discovery that certain nonaqueous ionizing solvents and many of their derivatives are capable of being used as electrolytes for, heat-activated, electrochemical cells; it has been found that the compounds known as amides such as formamide, acetamide and many derivatives are capable of dissolving various inorganic salts, for example the sulfates, halides, or a mixture of halides and sulfates, of the group I and group II elements of the periodic table. In the present invention, the nonaqueous electrolytes are water free within the limits of the best practical determination. The nonaqueous electrolytes are suitable for, heat-activated, electrochemical cells since most of them are solid at room temperature and require heat for melting them.

It is an object of the present invention to provide a new and improved current-producing, heat-activated, electrochemical battery cell using a non-aqueous electrolyte and operable over a broad range of temperatures.

It is another object of the invention to provide a new and improved non-aqueous electrolyte for a current-producing battery cell.

Still another object of the invention is to provide, heat-activated, electrochemical cells using nonaqueous ionizing solvents and derivatives thereof as electrolytes.

A further object of the invention is to provide new and improved current-producing battery cell electrolytes using amide derivatives solvents with inorganic salts dissolved therein.

A still further object of the invention is to provide a new and improved electrolyte for current-producing heat activated reserve power supply using ionizing non-aqueous electrolytes.

Other objects and many of the attendant advantages of this invention will become readily appreciated as the same becomes better understood by reference to the following detailed description when considered in connection with the accompanying drawings wherein.

Figure 1:
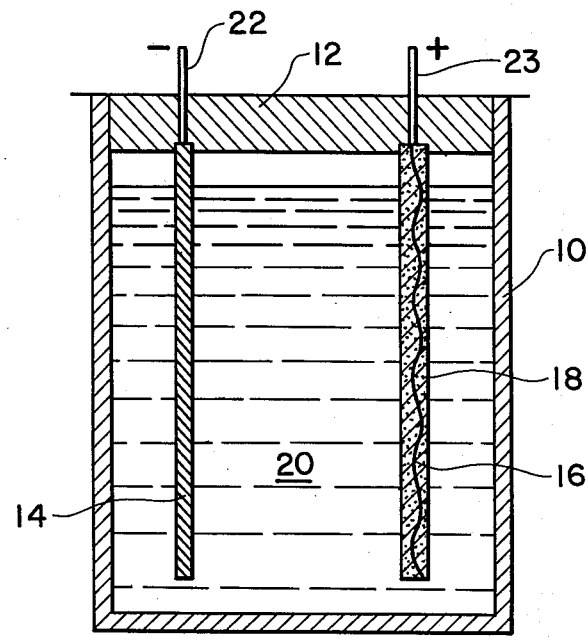
FIGURE 1 is one embodiment of the invention showing a sectional elevation of a conventional current-producing cell.

The battery cell shown in FIGURE 1 comprises a container 10, having a closure section 12, and is composed of a non-conductive material which is resistant to the electrolyte, to moisture, and to heat within the range of use. Within the container 10 is an anode 14 of magnesium, calcium, zinc, cadmium or aluminum, for example, and a cathode 16 of another material such as nickel, iron, or platinum, for example, having, if desired, a suitable depolarizer coating 18 such as an oxide, sulfide or sulfate or other compound of the various metals, preferably a transition metal, applied about the cathode depending on the application of the cell. A non-aqueous electrolyte 20 comprised of acetamide or higher homologues of the alkyl amides, represented by the formula R—$CONH_2$, where R is an alkyl group, or their derivatives such as trichloroacetamide, 2-chloroacetamide, propionamide, α-phenyl acetamide, dimethyl propionamide, N-phenyl acetamide, N-methyl acetamide, for example, fills container 12 and contacts electrodes 14 and 16. Conductors 22 and 23, connected to electrodes 14 and 16 respectively, extend through closure section 12 and serve as cell terminals. This invention relates primarily to the electrolyte system in liquid or solid state to which there may or may not be added a suitable depolarizer depending on application of the battery cell in which it is used. For example, the various amides listed in Table I comprise a group of compounds from which an electrolyte can be selected. Table I is only meant to be representative of the compounds available, and not all inclusive.

Table I

| Anode | Cathode | Electrolyte composition Solvent + Salt By Weight | Open Circuit Voltage | Closed Circuit Voltage | Current Density ma./cm.$^2$ | Temp. °C. |
|---|---|---|---|---|---|---|
| Magnesium | $V_2O_5$—$B_2O_3$ glass on nickel. | Acetamide + 21% KCl | 2.74 | .56 | 42 | 200 |
| Do | ___do___ | Acetamide + 21% NaCl | 2.76 | .72 | 40 | 200 |
| Do | ___do___ | Acetamide + 25% LiCl | 2.81 | 1.32 | 80 | 200 |
| Do | ___do___ | ___do___ | 2.72 | 1.30 | 80 | 150 |
| Do | ___do___ | Acetamide + 20% AgCl | 2.22 | .24 | 20 | 150 |
| Do | Ni | Acetamide saturated with $Li_2CO_3$. | 1.50 | .11 | 6 | 150 |
| Do | $V_2O_5$—$B_2O_3$ glass on nickel. | ___do___ | 2.25 | .75 | 5 | 150 |
| Do | ___do___ | Acetamide saturated with $Li_2SO_4$. | 2.91 | .80 | 5 | 150 |
| Calcium | Ni | Dimethyl Acetamide with 5% LiBr. | 2.28 | .20 | 5 | 25 |
| Do | $V_2O_5$—$B_2O_3$ glass on nickel. | ___do___ | 2.74 | 1.00 | 5 | 25 |
| Magnesium | ___do___ | ___do___ | 2.02 | .44 | 12 | 25 |
| Do | Nickel | N-methyl acetamide saturated with LiBr. | 1.00 | | | 30 |
| Calcium | ___do___ | ___do___ | 2.06 | | | 30 |
| Magnesium | $V_2O_5$—$P_2O_5$ glass on nickel. | Acetamide saturated with LiCl. | 2.56 | .20 | 14 | 150 |

N-methyl acetamide has a melting point just above room temperature. A solution of an inorganic salt in this solvent will lower the melting point to some extent, but the electrolyte can be used up to temperatures approaching its boiling point when enclosed in a suitable container.

The melting point of acetamide (81° C./176° F.) is such as to make it a very desirable electrolyte for incorporation in a low temperature, heat-activated, electrochemical battery. Acetamide is especially useful in heat activated reserve power supplies because of its high dissolving power for alkali metal salts. Dimethyl acetamide with added salts can be used in a fluid electrolyte battery (at ambient temperatures) or acetamide and N-methyl acetamide in a heat-activated, electrochemical battery where melting of the electrolyte activates the power supply. The operable temperature range will depend on the salt additive incorporated, for example above 75°, the melting point of acetamide with added salts, up to the boiling point of the electrolyte mixture.

In the battery cell of FIGURE 1, previously described, the electrolyte is incorporated in a conventional container 10 provided with an anode 14, a cathode 16, and a depolarizer 18, if desired. In addition the container may be sealed with closure 12 in order that the electrolyte used may be maintained at a certain pressure.

Figure 2:
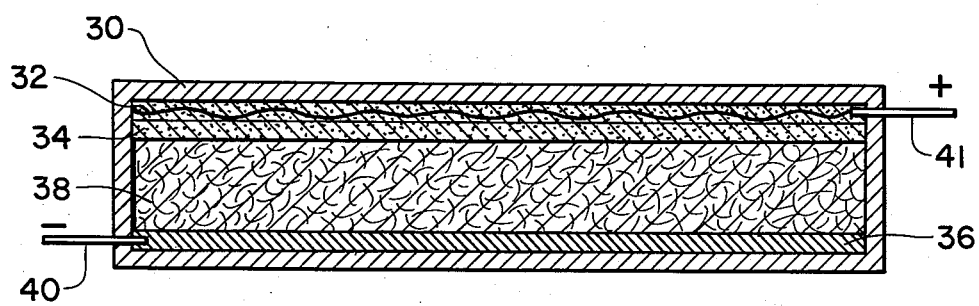
FIGURE 2 is another embodiment of the invention showing a sectional elevation of a flat, heat-activated, electrochemical cell.

In the type of cell shown in FIGURE 2, the electrolyte is chosen to be a solid at ambient temperatures and must be heated to activate the cell. This cell comprises a case 30 of a material having similar characteristics to the cell container of FIGURE 1. The cathode 32 has a depolarizer coating 34 thereon facing toward the anode 36. An electrolyte layer 38 is disposed between the depolarizer cathode and the anode. It is necessary to incorporate a material in conjunction with the electrolyte such that when heat is applied the electrolyte will remain in contact with the electrodes. Such material used in conjunction with the amide electrolytes can be fibrous, platy or powdered and inert to the electrolyte, but which will prevent the electrolyte from flowing away from contact with the electrodes. Conductors 40 and 41 serve as cell terminals. The battery cells of FIGURES 1 or 2 can have incorporated into their design a chemical or other type conventional heat source for activating the cells when desired by melting the electrolyte.

Obviously many modifications and variations of the present invention are possible in the light of the above teachings. It is therefore to be understood that within the scope of the appended claims the invention may be practiced otherwise than as specifically described.

What is claimed is:

1. A current-producing, heat-activated, electrochemical cell including an anode, a cathode and an electrolyte, said electrolyte being solid at room temperature and consisting essentially of an ionizing nonaqueous solvent chosen from the group consisting of homologues of the alkyl amides, represented by the formula R—$CONH_2$, where R is an alkyl group having dissolved therein at least one salt chosen from the group consisting of halides, sulfates and carbonates of group I and group II elements of the periodic table.

2. In a current-producing, heat-activated, electrochemical battery cell having a positive electrode and a negative electrode, a nonaqueous electrolyte which is solid below 75° C. in contact with said electrodes and consisting essentially of acetamide having dissolved therein a salt chosen from the group consisting of halides, sulfates and carbonates of group I and group II elements of the periodic table, said electrolyte being usable from its melting point which is above room temperature up to its boiling point.

3. A heat-activated electrochemical current producing cell comprising a positive and a negative electrode, an electrolyte in contact with said electrode, said electrolyte consisting essentially of a nonaqueous ionizing solvent chosen from the group consisting of homologues of the alkyl amides represented by the formula R—$CONH_2$, where R is an alkyl group having at least one salt dissolved therein chosen from the group consisting of halides, sulfates and carbonates of group I and group II elements of the periodic table, said electrolyte being usable from its melting point which is above room temperature up to its boiling point.

4. In a current-producing, heat-activated, electrochemical cell having a positive electrode and a negative electrode, an electrolyte in contact with said electrodes consisting essentially of a nonaqueous ionizing solvent of N-methyl acetamide having dissolved therein at least one salt chosen from the group consisting of halides, sulfates and carbonates of group I and group II elements of the periodic table, said electrolyte being usable from its melting point above room temperature up to its boiling point.

5. A heat-activated current-producing battery cell having an anode, a cathode and a suitable depolarizer, a nonaqueous electrolyte which is solid at and below room temperature in contact therewith consisting essentially of an ionizing solvent from the group consisting of homologues of the alkyl amides represented by the formula R—$CONH_2$, where R is an alkyl group having at least one salt dissolved therein chosen from the group consisting of halides, sulfates and carbonates of group I and group II elements of the periodic table, said electrolyte being usable from its melting point above room temperature up to its boiling point.

6. In a current-producing battery cell having a positive electrode and a negative electrode, a nonaqueous electrolyte in contact with said electrodes consisting essentially of a nonaqueous ionizing solvent of acetamide having 21% by weight potassium chloride dissolved therein, said electrolyte being usable from its melting point above room temperature up to its boiling point.

7. In a current-producing battery cell having a positive electrode and a negative electrode, a nonaqueous electrolyte in contact with said electrodes consisting essentially of acetamide having 21% by weight sodium chloride dissolved therein, said electrolyte being usable from its melting point above room temperature up to its boiling point.

8. In a current-producing battery cell having a positive electrode and a negative electrode, a nonaqueous electrolyte in contact with said electrodes consisting essentially of acetamide having 25% by weight lithium chloride dissolved therein, said electrolyte being usable from its melting point above room temperature up to its boiling point.

9. In a current-producing battery cell having a positive electrode and a negative electrode, a nonaqueous electrolyte in contact with said electrodes consisting essentially of acetamide having 20% by weight silver chloride dissolved therein, said electrolyte being usable from its melting point above room temperature up to its boiling point.

10. In a current-producing battery cell having a positive electrode and a negative electrode, a nonaqueous electrolyte in contact with said electrodes consisting essentially of acetamide saturated with lithium carbonate, said electrolyte being usable from its melting point above room temperature up to its boiling point.

11. In a current-producing battery cell having a positive electrode and a negative electrode, a nonaqueous electrolyte in contact with said electrodes consisting essentially of acetamide saturated with lithium sulfate, said electrolyte being usable from its melting point above room temperature up to its boiling point.

12. In a current-producing battery cell having a positive electrode and a negative electrode, a nonaqueous electroylte in contact with said electrodes consisting essentially of acetamide saturated with lithium chloride, said electrolyte being usable from its melting point above room temperature up to its boiling point.

13. In a current-producing battery cell having a positive electrode and a negative electrode, a nonaqueous electrolyte in contact with said electrodes consisting essentially of acetamide having 5% by weight lithium bromide dissolved therein, said electrolyte being usable from its melting point above room temperature to its boiling point.

14. In a current-producing battery cell having a positive electrode and a negative electrode, a nonaqueous electrolyte in contact with said electrodes consisting essentially of a nonaqueous ionizing solvent chosen from the group consisting of homologues of the alkyl amides represented by the formula R—$CONH_2$, where R is an alkyl group having at least one salt dissolved therein chosen from the group consisting of halides, sulfates and carbonates of group I and group II elements of the periodic table, said electrolyte being usable from its melting point above room temperature up to its boiling point.

15. In a current-producing battery cell having a positive electrode and a negative electrode, a nonaqueous electrolyte in contact with said electrodes consisting essentially of an alkyl amide represented by the formula R—$CONH_2$, where R is an alkyl group having a melting point above room temperature and at least one salt dissolved therein chosen from the group consisting of halides, sulfates and carbonates of group I and group II elements, of the periodic table, said electrolyte being usable from its melting point above room temperature up to its boiling point.

References Cited in the file of this patent

UNITED STATES PATENTS

| | | |
|---|---|---|
| 2,291,739 | McGrath | Aug. 4, 1942 |
| 2,433,024 | Burgess | Dec. 23, 1947 |
| 2,445,306 | Lawson | July 13, 1948 |
| 2,597,456 | Coleman et al. | May 20, 1952 |
| 2,844,642 | Scharz et al. | July 22, 1958 |
| 2,909,470 | Schmidt | Oct. 20, 1959 |
| 2,948,767 | Johnson et al. | Aug. 9, 1960 |
| 3,001,108 | Mohler et al. | Sept. 19, 1961 |

FOREIGN PATENTS

| | | |
|---|---|---|
| 695,398 | Germany | Aug. 24, 1940 |